United States Patent [19]

Wei et al.

[11] Patent Number: 5,209,607
[45] Date of Patent: May 11, 1993

[54] POWDER FEEDER APPARATUS

[75] Inventors: Nan Wei; Philip M. Rose, both of Naperville; Chi-Hung Lin; David R. Kreider, both of Wheaton; Ronald P. Stark, Oswego, all of Ill.

[73] Assignee: Amoco Corporation, Chicago, Ill.

[21] Appl. No.: 397,988

[22] Filed: Aug. 24, 1989

[51] Int. Cl.$^5$ .................. B65G 53/08; B65G 53/10; B01J 8/00
[52] U.S. Cl. ........................ 406/66; 222/636; 406/63; 406/67; 422/131; 422/219
[58] Field of Search ............ 422/213, 219, 232, 131; 406/63, 66, 67, 85; 141/67; 222/636, 637, 370, 240, 242

[56] References Cited

U.S. PATENT DOCUMENTS

| | | | |
|---|---|---|---|
| 2,921,721 | 1/1960 | Brooks | 222/636 |
| 3,779,712 | 12/1973 | Calvert et al. | 222/370 |
| 3,790,550 | 2/1974 | Miller | 422/135 |
| 4,126,250 | 11/1978 | Gram | 222/242 |
| 4,184,258 | 1/1980 | Barrington et al. | 222/636 |
| 4,253,591 | 3/1981 | Karikas | 222/636 |
| 4,610,574 | 9/1986 | Peters | 422/131 |
| 4,746,250 | 5/1988 | Schoppe | 406/66 |
| 4,785,976 | 11/1988 | Bennie et al. | 222/370 |
| 4,863,076 | 9/1989 | Anderson et al. | 222/631 |
| 4,997,318 | 3/1991 | Kostecki et al. | 406/66 |

*Primary Examiner*—Peter Kratz
*Attorney, Agent, or Firm*—James R. Henes; Wallace L. Oliver; Frank J. Sroka

[57] ABSTRACT

This invention relates to an apparatus and process for feeding powder or dry solids catalyst into a flowing liquid stream. More particularly, the invention includes an apparatus which includes a novel purging device and means for isolating a metering means from a liquid stream, and process for injecting finely divided flowable powder or catalyst into a flowing liquid stream, which in turn is fed into a reactor utilized for the production of polypropylene or polyolefins.

7 Claims, 1 Drawing Sheet

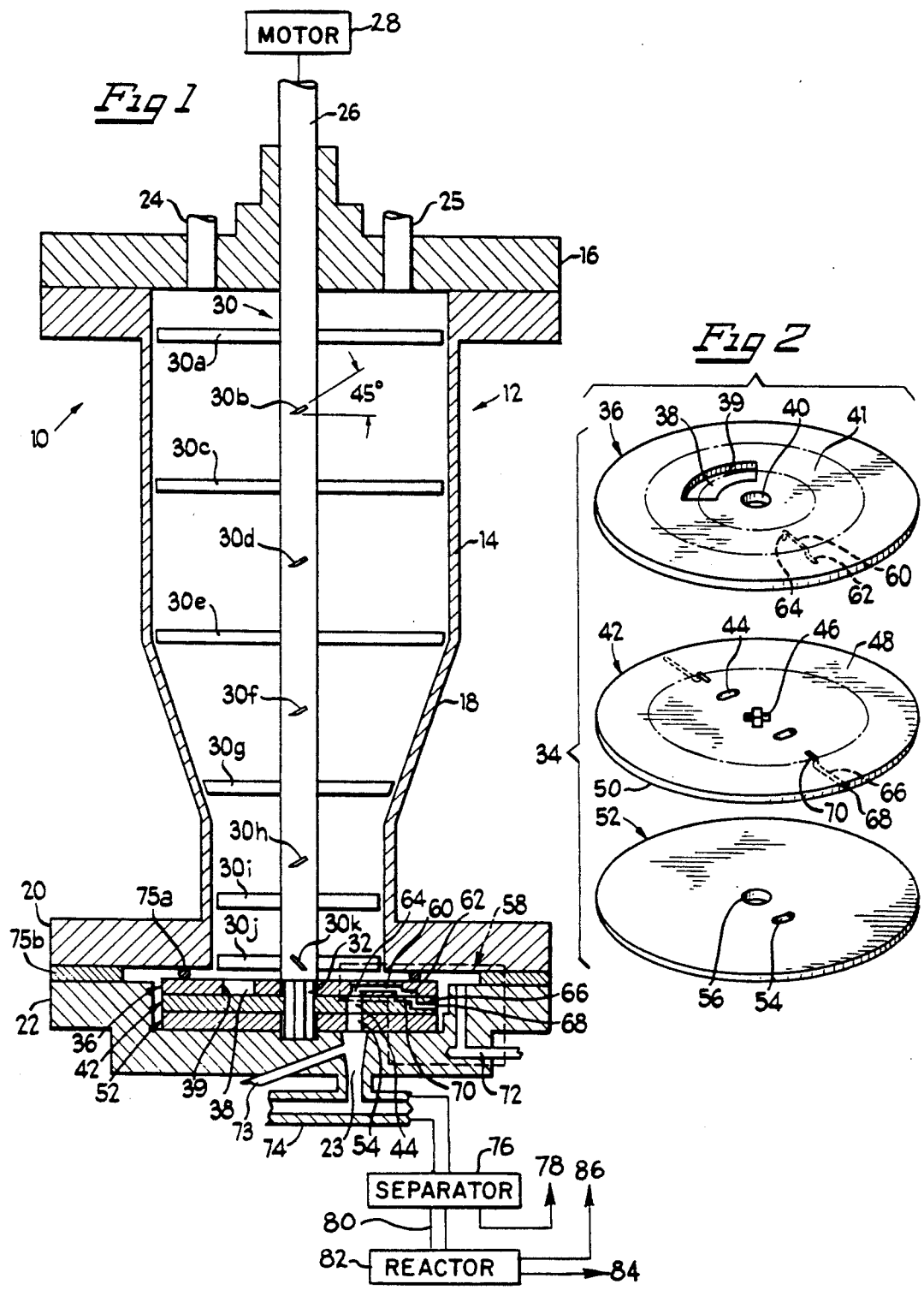

POWDER FEEDER APPARATUS

FIELD OF THE INVENTION

This invention relates to an apparatus and process for feeding powder or dry catalyst into a flowing liquid stream. More particularly, this invention includes novel isolating means and a purging device, and process for injecting finely divided powder or catalyst into a liquid stream, which in turn can be fed into a reactor utilized for the production of polypropylene and other polyolefins.

BACKGROUND OF THE INVENTION

A current technique for feeding catalyst in a gas phase polypropylene process includes a hexane slurry catalyst feeding system. This system requires (1) charging a holding tank with a hydrocarbon diluent; (2) metering specific amounts of a hydrocarbon diluent and a dry catalyst into a mixing tank; (3) mixing the hydrocarbon diluent with catalyst under constant agitation for producing a homogeneous and accurate concentration; (4) circulating and filtering the slurry to remove large agglomerates before conveying into a holding tank; (5) pumping or metering the slurry from the holding tank at a pre-select rate into a reactor; and (6) feeding the resultant polymer powder through equipment for removing the hydrocarbon diluent and residual propylene from the polypropylene. One of the problems of this slurry feeding system is the capital costs required in, for example, the mixing tanks, transferring, pumps, filtering system, holding tank, metering pumps, check valves, the associated instrumentation for each of the above, etc., which is highly complex and subject to frequent and costly maintenance. In addition, it is highly desirable to simplify the process by, for example, removing the hydrocarbon diluent or any other type of solvent from the system, thereby reducing the size of the deactivation equipment, such as the purge column downstream of the reactor.

Over the years a number of processes and apparatus have been suggested for the production of polyolefins. Typifying these, are those found in U.S. Pat. Nos. 3,915,890; 4,123,601; 4,409,186; 4,563,665; 4,610,574 and 4,698,211. These processes and apparatus have met with varying degrees of success.

U.S. Pat. No. 3,779,712 discloses an apparatus for injecting coarsely divided solid materials into a reaction chamber. This patent requires a rotating shaft connected to a metering means and a conduit means disposed between a gas entrainment means and reaction chamber including a capillary tube with a small inside diameter adapted to deliver entrained finely divided materials from the gas entrainment means to the reaction chamber. It is believed that this apparatus would not work for the new high activity catalysts currently in use for the production of polypropylene, because such catalysts are extremely small or fine, and therefore tend to stick and adhere to all the surfaces such catalyst contacts. As a result, this catalyst would bridge and block the metering means, and would resist falling through the metering means due to gravity.

U.S. Pat. No. 3,876,602, a division of U.S. Pat. No. 3,779,712, discloses a method to polymerize a monomer in a fluidized bed in which a gaseous stream of monomer is fed continuously into a reaction zone comprising introducing a pressurized second gas stream containing catalyst particles into the polymerizable monomer in the reaction zone through an elongated cylindrical zone having a certain diameter. This method requires a large reactor which can withstand high pressures due to the large volume of gas therein. It is undesirable to have large amounts of an inert gas in a reactor because such gas lowers the concentration of olefin monomer in the reactor decreasing polymerization efficiency.

U.S. Pat. No. 3,790,550 discloses a process for catalytic polymerization of a gaseous monomer in a fluidized bed in which catalyst particles are dispersed into a chamber alternately communicable with a supply source and a reaction zone; isolating the dispersed catalyst particles from the supply source; exposing the catalyst particle to the reaction zone; and injecting the particles into the side of the reaction zone with a carrier gas at a specified pressure and rate. A significant volume of gas enters the reaction zone, adversely effecting the productivity of the process.

It is, therefore, desirable to provide an improved powder feeder process and apparatus, which is simple in construction, which overcome most, if not all of the above problems, and which realizes important economic benefits through savings in, for example, energy consumption, raw materials and capital equipment, and which is reliable and is easily maintained.

SUMMARY OF THE INVENTION

A powder feeder apparatus, comprising: a generally elongated container including an upper portion and a lower portion having a chamber; a rotatable shaft substantially in alignment with an axial axis and further substantially in alignment with and at least partially in said container; metering means for selectively metering a predetermined amount of said powder to said chamber of said container, said metering means disposed in said lower portion of said container and operatively attached to said rotatable shaft; and means for selectively purging said powder from said chamber of said container disposed in said lower portion of said container.

A catalyst feeding process, comprising the steps of: charging catalyst into a holding tank; collecting a predetermined amount of the catalyst; selectively discharging the collected catalyst into a flowing liquid stream with a pulse of a gaseous material; and conveying the catalyst and liquid stream into a polymerization reactor.

It is therefore an object of the present invention to provide an apparatus and process for feeding a powder into a liquid stream, with short pulses of a gaseous material thereby efficiently occupying a minimal volume of the overall reactor volume, thereby providing a larger effective volume to produce polypropylene in the reactor.

Another object of the present invention is to provide an apparatus and process which substantially provides a pulsed and substantially continuous flow of powder into a liquid stream, while minimizing the possibility of clogging or plugging.

Another object of the present is to provide an apparatus and process which includes a discharge chamber which is adapted to be filled with a gaseous material which isolates the moving parts herein from the liquid stream.

Another object is to provide an apparatus and process for producing polypropylene whereby product quality and uniformity are improved.

Another object is to provide an apparatus and process for continuous intermittent injecting of a fine powdery catalyst into a reactor as a dispersion of such material in a carrier liquid.

A further object is to provide an apparatus for poly(olefin) production wherein the generation of large agglomerates of catalyst is greatly reduced or totally eliminated.

These and other objects of the present invention will become more apparent from a consideration of the following description and drawings.

BRIEF DESCRIPTION OF THE DRAWINGS

FIG. 1 of the drawings is a cross-sectional view of a powder feeder apparatus and process for use in the practice of this invention.

FIG. 2 of the drawings is an enlarged partial perspective view of FIG. 1 in accordance with the practice of this invention.

DETAILED DESCRIPTION OF THE PREFERRED EMBODIMENTS

While this invention is susceptible of embodiments in many forms, there are shown in FIGS. 1 and 2 an embodiment suitable for use in the practice of this invention, with the understanding that the present disclosure is not intended to limit the invention to the embodiment illustrated.

Referring to FIG. 1, a powder feeder or powdery catalyst feeder apparatus 10 and process, which is particularly adapted to feeding high activity supported catalyst into a flowing liquid stream, which in turn is fed into a reactor vessel utilized for the production of polypropylene, is illustrated. However, it should be understood by those skilled in the art, that the instant process and apparatus can be utilized to feed any type of powder into a flowing liquid stream.

The powder feeder apparatus 10 includes a generally elongated or funnel shaped container 12 for temporary storage of the powder, including an upper portion 14 with a top section 16, and a lower portion 18 having a flange 20 and a bottom section 22 with a gaseous trap, cavity or chamber 23. Preferably, the top section 16 includes an opening or powder inlet 24 for filling the elongated container 12 with a powder, such as but not limited to a dry powdery catalyst, and a pressure inlet 25 for maintaining the container 12 and contents therein under pressure. In a preferred embodiment, an inert gas is supplied through pressure inlet 25, since inert gas is not reactive with catalysts used for the production of polypropylene. The chamber 23 of the bottom section 22 is where the powder eventually exits, or is purged or pushed out of container 12.

The powder feeder assembly 10 includes a rotatable shaft 26 with an operatively attached motor 28 for rotating shaft 26. The number of revolutions per minute (rpm) of motor 28 can vary widely depending on the amount of powder to be fed by powder feeder apparatus 10, preferably the motor includes less than about 10 rpm. The shaft 26 is substantially in alignment with an axial axis which runs substantially through the middle or center of the top section 16, and upper and lower portion 14 and 18 of the elongated container 12. The shaft 26 is substantially in alignment with and at least partially in the container 12. In a preferred embodiment, agitating means, mixers, stirrers, or radially extending elements are attached to and extend radially outwardly from the shaft 26 in container 12. The agitating means are in substantial alignment with a radial axis, and perpendicular to container 12 and shaft 26. The agitating means from the upper portion 14 to the lower portion 18 of container 12, include a first radially extending element or stirring blade 30a, a second radially, extending element 30b, a 3rd radially extending element 30c, a 4th radially extending element 30d, a 5th radially extending element 30e, a 6th radially extending element 30f, a 7th radially extending element 30g, and 8th radially extending element 30h, a 9th radially extending element 30i, a 10th radially extending element 30j and an 11th radially extending element 30k. Radially extending elements 30a, 30c, 30e, 30g, 30i, and 30j are generally perpendicular to or 90° out of phase with radially extending elements 30b, 30d, 30f, 30h, and 30k. Preferably, the radially extending elements 30a–k extend upwardly at an angle of inclination ranging from about 85° to about 5° with respect to the radial axis, more preferably from about 30° to about 60°, and most preferably about 45°. Also in a preferred embodiment, the 10th and 11th radially extending elements 30j and 30k are at opposing angles, to minimize any clogging or bridging in or near the lower portion 18 and flange 20 of the container 12. In operation, when shaft 26 is rotated, the radially extending elements 30a–j "fluff-up" or substantially eliminate or minimize the possibility of clogging or the formation of large chunks in container 12, while radially extending element 30k substantially pushes the power in proximity thereto, generally downwardly in a direction toward metering means 34. In a preferred embodiment, each of the radially extending elements 30a–k, extend radially to a point just short of the inside surface of container 12, and radially extending elements 30j and 30k are situated immediately above a metering means 34, for preventing bridging or clogging in proximity thereto, and pushing such powder forward to meeting means 34.

The rotatable shaft 26 includes a bottom section or a key section 32 adapted to rotate or connect, for example, to a disc 42.

Referring to FIG. 2, metering means 34 for selectively metering a predetermined amount of powder or catalyst to the chamber 23 of container 12, is illustrated. The metering means 34 includes an upper stationary section or disc 36 at the top and a rotatable section or disc 42 there below. The stationary and rotatable sections 36 and 42, are substantially in alignment with a radial axis. The stationary section 36 has an exit cavity or opening 38, and in a preferred embodiment, downwardly and inwardly inclined sidewalls or ledges 39, for facilitating and directing the downward flow of the powder to and in exit cavity 38. In a preferred embodiment, ledges 39 extend downwardly at an angle of inclination ranging from about 85° to about 5° with respect to the radial axis, more preferably from about 30° to about 60°, and most preferably about 45°. The stationary section 36 has a shaft aperture 40 for allowing the bottom of the rotatable shaft 26 key section 32 to project or extend therethrough unhindered, without moving or rotating the stationary section 36 when in operation. The stationary section 36 also includes a middle radial section 41 in phantom in FIG. 2.

Immediately below, coextensive with, and adjacent to the stationary section 36, is the rotatable section 42, which includes at least one metering port 44, a key aperture 46 in the center, an outer section 48 in phantom in FIG. 2 and an edge 50. In a preferred embodiment, there is a plurality of metering ports 44 located circumferentially around the rotatable section 42. Each metering port 44 being located about the same distance from the center or key aperture 46. The bottom surface of rotatable section 42 can be polished or coated with a low friction material, to minimize the torque needed to rotate rotatable section 42 and rotatable shaft 26.

In a preferred embodiment, the metering means 34 further includes a lower stationary section or third disc 52 located below, coextensive with, and adjacent to rotatable section 42. The bottom stationary section 52 has an exit cavity 54 in alignment with the chamber 23 of container 12, and a shaft aperture 56 for allowing the shaft 26 key section 32 to extend therethrough and to rotate freely.

In a preferred embodiment, the metering means 34 upper and lower stationary sections 36 and 52 comprise a thermoplastic material, and the rotatable section 42 comprises a metal, such as but not limited to a hardened stainless steel.

The rotatable section 42 includes, at least two positions, a first or filling position which fills the metering port 44 with powder when the exit cavity 38 of the stationary section 36 and the metering port 44 of the rotatable section 42 are in substantial alignment, and a second or emptying position, where the filled metering port 44 from the aforementioned first position is rotated to a position where the metering port 44 of the rotatable section 42 and the chamber 23 of the bottom section 22 of the container 12 are in substantial alignment. In a preferred embodiment, as illustrated in FIG. 2, two or more metering ports 44 can be utilized, for example, so that the first metering port can be emptied while the second is being filled, and subsequently, a half cycle or 180° later, the second metering port can be emptied while the first is being filled. Such an embodiment requires a lower number of revolutions per minute from motor 28, than an embodiment with only one metering port 44.

In the design of the powder feeder apparatus 10 and process of this invention, elaborate steps have been taken to minimize or prevent the chances of clogging, bridging or clumping of the powder or catalyst in and around the powder feeder apparatus 10 and other components in FIG. 1. The possibility of clogging, bridging, and clumping is even more severe when fine or small powder or catalyst is utilized, rather than larger sized powder. For example, fine powder or catalyst does not tend to fall readily due to gravity, and tends to stick and adhere to the inside walls of the container 12, the stationary section 36 ledges 39 of exit cavity 38, inside wall of metering port 44 of rotatable section 42, inside wall of exit cavity 54 of bottom stationary section 52, and inside wall of chamber 23.

In order to minimize the chances of clogging, bridging, plugging, clumping, etc., of the metering means 34, a purge means 58 is necessary to provide, for example, a blast of a gaseous material to discharge and convey the powder or catalyst from and through the metering means 34, thereby allowing substantially continuous intermittent feeding of the powder to a liquid stream. More particularly, the purging means 58 in FIG. 1, includes a stationary conduit, pipe, vent, opening or channel 60, on, adjacent to, or preferably in stationary section 36. The stationary conduit 60 extends radially outwardly in a direction away from shaft aperture 40. Referring to FIG. 2, the stationary conduit 60 is located in and extends radially across and adjacent to a portion of the middle section 41 of the stationary section 36. The stationary conduit 60 includes a downwardly facing entrance 62 and a downwardly facing exit 64 positioned inwardly or nearer to shaft aperture 40 than entrance 62. In a preferred embodiment, the downwardly facing exit 64 is inclined annularly and outwardly at an angle of inclination ranging from about 85° to about 5° with respect to the radial axis, more preferably from about 30° to about 60°, and most preferably about 45° for a maximum blast therethrough.

The purging means 58 further includes a rotating conduit, pipe, vent, opening or channel 66, on, adjacent to, or preferably in the outer section 48 of rotatable section 42, which includes an outwardly facing entrance 68 on edge 50 and an upwardly facing exit 70. The upwardly facing exit 70 of rotatable conduit 66 and the downwardly facing entrance 62 of stationary conduit 60 can have any geometric shape, provided each is the same. A preferred shape is oblong, as illustrated in FIG. 2. In a preferred embodiment, as illustrated in FIG. 2, more than one rotatable conduit 66 can be included for two purge cycles per revolution. The entrance 68 is connected to a purge conduit or inlet 72, in the bottom section 22 of container 12, which in turn is connected to an inert gaseous material under pressure, preferably an inert gas such as nitrogen because it is non-reactive with the catalysts used herein to make polypropylene or polyolefin.

The purging means 58 is configured in a manner such that it is moveable from a first non-purge or closed position to a second purge or open position. More particularly, in the non-purge position the rotating channel 66 upwardly facing exit 70 of rotatable section 42 is not in substantial alignment with the entrance 62 of stationary channel 60 of stationary section 36. Further, the metering port 44 of rotatable section 42 and the chamber 23 of the container 12 are not in substantial alignment during the closed position, so a purge blast is undesirable and unnecessary at this time in a cycle. Stated differently, the purging means 58 is closed or off during this part of each cycle or revolution. In operation, the purge means 58 is in the non-purge or closed position during part of the cycle, depending on the number of metering ports 44. For example, in FIG. 2, there are only two blasts per cycle or revolution of rotatable section 42. In the second-purge or open position illustrated in FIG. 1, the rotatable conduit 66 upwardly facing exit 70 or rotatable section 42, is in substantial alignment with the entrance 62 of stationary channel 60 of stationary section 36, thereby allowing a gaseous material to purge or blast downwardly through downwardly facing exit 64, through metering port 44 of rotatable section 42, exit cavity 54 of bottom stationary section 52, and chamber 23 to a liquid stream in conduit 74. Also during the purge part of the cycle, the metering port 44 of the rotatable section 42 and the chamber 23 of the container 12, are in substantial alignment, or the aforementioned metering means 34 is in the emptying position which calls for a short blast of a gaseous material from purge means 58 to substantially evacuate the powder in the metering port 44 and the chamber 23.

The purge conduit 72 in FIG. 1, is connected to a gaseous material source which allows such gas to travel through conduit 72, through the entrance 68 and upwardly facing exit 70 of the rotating channel 66 to and through the downwardly facing entrance 62 and downwardly facing exit 64 of stationary exit 60. When in the purge position of each revolution or cycle, a blast of gaseous material, such as nitrogen, substantially purges, empties, and cleans out the metering port 44 and chamber 23, and the exit cavity 54 of the bottom stationary section 52, if included.

It should be noted that the short pulses of gaseous material from purging means 58 not only provide a means for feeding a dry powder to a liquid stream, but also eliminate the need for a partition, valves, shutoff valves, slugger valves, etc. In particular, the dynamic difference in pressures of the gaseous material in the chamber 23 and the liquid stream in transporting medium conduit 74, i.e. the former pressure being greater than that of the latter, substantially minimizes the possibility of the liquid stream traveling upwardly through chamber 23, to reach exit cavity 54 of stationary section 52 and metering port 44 of rotatable section 42. Stated differently, the dynamic pressure differential of the gaseous material pulses from purging means 58 and the liquid stream flow, maintain a gaseous chamber 23 or isolating means which isolates the stationary section 52 and rotatable section 42 from the liquid stream, without the use of slugger valves, their actuators and controller. All that is required is that the gaseous material in chamber 23 be lighter than the liquid stream in the transporting medium conduit 74.

A conduit 73 can be included which allows nitrogen to continuously enter and flow into gaseous chamber 23 to help minimize the accumulation of powder therein, and more importantly, to substantially prevent the liquid from entering the gaseous chamber 23 when the pulses from purging means 58 are infrequent.

It should be understood by those skilled in the art that the instant powder feeder apparatus 10 can be utilized to feed any type of flowable powder into a flowing liquid stream. In a preferred embodiment of this invention, the chamber 23 is connected to a transporting medium conduit 74. In operation the powder is directed to the flowing liquid stream in transporting medium conduit 74, then to an optional separator 76 where the excess gaseous material is separated out through gas outlet 78, and the powder and liquid stream continues from separator outlet 80 to reactor 82. It should be understood, that since only a short pulse is required by purging means 58, the separator 76 may not be necessary. The reactor includes a product outlet line 84 and waste or recycle outlet line 86.

In use, a process for feeding a powder, preferably a catalyst, into a liquid stream, is disclosed, which in turn is particularly adapted to feeding such catalyst and liquid stream into a reactor for the production of polypropylene. More particularly, catalyst is fed through the powder inlet line 24 to elongated container 12 at a pre-selected height. A gaseous material is used to maintain container 12 under pressure. Preferably, nitrogen is used for this purpose since it is nonreactive with the catalyst. It should be appreciated by those skilled in the art that the container pressure can range widely, preferably the container pressure is maintained at a range from about 275 psi to about 500 psi, more preferably about 300 psi to about 350 psi, and most preferably about 310 psi. The catalyst in container 12 can be at any temperature, and typically is at about ambient temperature.

The catalyst is slowly agitated while in container 12 to prevent or minimize clumping of the catalyst therein. This is accomplished by energizing motor 28 which is operatively coupled to the rotatable shaft 26. The agitating means, which include radially extending elements 30a-k rotate substantially continuously at a predetermined rate, such as from about 0.2 rpm to about 50 rpm.

The first ten radially extending elements 30a-30j, are configured at an inclination so as to slightly lift or "fluff up" the catalyst, to prevent or minimize clumping and to maintain a substantially homogeneous catalyst mix in container 12. The 11th radially extending element 30k is configured at an angle opposing the first ten to push at least some of the catalyst through the exit cavity 38 to the metering port 44 of the rotatable section 42, while radially extending elements 30j and 30k substantially prevent or minimize bridging above or in proximity of exit cavity 38 of stationary section 36 in the container 12. The key section 32 of rotatable shaft 26 is configured to fit snugly in key aperture 46 to provide a continuous rotation of rotatable section 42.

Concurrently, while the catalyst is being mixed as described above, a predetermined amount of the powder or catalyst is collected and pushed into metering port 44 of rotatable section 42, when in alignment with the exit cavity 38 of the stationary disc 36. In this so called "filling position" part of the cycle some of the catalyst falls due to gravity into the metering port 44 and some is pushed downwardly by radially extending element 30k therein, to uniformly fill exit cavity 38. As illustrated in FIG. 2, more than one metering port 44 can be utilized. In such an instance, the motor 28 can then be run at a slower rate due to the fact that more catalyst is collected in two metering ports 44, during each revolution or cycle. After the metering port 44 has been filled with a predetermined amount of catalyst, the rotatable section 42 which is driven by motor 28, continues to rotate to the emptying position part of the cycle, whereby the metering port 44 is substantially aligned with chamber 23 of the container 12. As illustrated in FIG. 1, when metering port 44 is in alignment with chamber 23 in the so called "emptying position," some of the collected catalyst in the metering port 44 falls downwardly due to gravity to and through the chamber 23 and some sticks and adheres to the side walls of metering port 44, exit cavity 54 and chamber 23. Accordingly, at this instant (i.e. during the emptying position) an intermittent blast of a gaseous material, preferably an inert gas such as nitrogen, is utilized to blow the catalyst off of the sidewalls and to convey the catalyst to a liquid stream. In particular, the nitrogen is fed from the source through the purge conduit inlet 72, through the entrance and upwardly facing exit 68 and 70 of rotating channel 66, through entrance and downwardly facing exit 62 and 64 of stationary channel 60, through metering port 44 of rotatable section 42, through exit cavity 54 of bottom stationary section 52, and through chamber 23 to the liquid stream in the transporting medium conduit 74. This is only a short blast, because the purging means 58 is in the open position only for a short period of time, sufficient to clean out and purge the metering port 44, exit cavity 54 and chamber 23. The gaseous material fed through the purging means 58 includes a peak-flow velocity which can range widely, preferably ranging from about 90 ft./sec. to about 30 ft./sec., more preferably ranging from about 70 ft./sec. to about 50 ft./sec., and most preferably about 60 ft./sec. It is desirable to use a minimal amount of such gaseous material because the more utilized, the larger the volume of space is taken up in the transporting medium conduit 74, and downstream in the reactor 82 itself thus causing inefficiency in the system. Further, if a substantial amount of gas is utilized, then a separator for separating the gas from the catalyst and liquid stream is required downstream.

The gaseous material connected to purge conduit 72 is maintained under pressure which is preferably about the same as that of container 12. The gaseous material pressure can range widely, preferably from a range from about 275 psi to about 500 psi, more preferably ranging from about 300 psi to about 350 psi, and most preferably about 310 psi.

In a preferred embodiment, the inert gaseous material, i.e., nitrogen, pulses keep the chamber 23 filled with nitrogen, and the excess nitrogen with the injected powder, i.e., catalyst, is carried away by the liquid stream. The nitrogen pulses keep the chamber 23 from being plugged. Further, the trapped nitrogen pressure in chamber 23 is greater than the pressure of the liquid stream, thereby isolating the chamber 23 and rotatable section 42 from the liquid stream. Thus, slugger valves, etc. are not required by the instant process and apparatus. Further, a short blast takes up a minimal volume, which is beneficial and more efficient, because this reduces the effective volume occupied by the nitrogen in conduit 74 and the reactor 82 downstream.

The catalyst feeding process described herein, works with any sized catalyst. It is particularly adapted for fine catalyst having small particle sizes, with average particle sizes of about $10\mu$ to about $30\mu$, because such fine particles tend to stick and adhere to the walls of the container 12, metering port 44, exit cavity 54, and chamber 23. The instant process is particularly configured to solve these problems.

The catalyst described herein is generally in the form of powdery free flowing solid particles. In general, the catalysts which are most useful are those which are very active and give a high yield on catalyst. Included in this group are cocatalysts composed of organometallic compounds of Periodic Groups IA, IIA and IIIA and catalysts which are based on transition metal compounds. Aluminum alkyl compound cocatalysts are especially preferred and may be a trialkylaluminum or an alkylaluminum halide such as a dialkylaluminum chloride. The transition metal catalyst can be a metal compound of Group IV or Group V such as a titanium or vanadium compound, a compound of Group VI such as chromium or molybdenum oxide or may be one of the above catalysts supported on a magnesium-based support or a support such as alumina, silica, or silica-alumina.

The preferred catalysts and cocatalysts are as aforesaid, high yield catalyst. By high yield is meant catalysts and cocatalysts the residues of which do not have to be removed from the products of the process.

The preferred catalysts and cocatalysts for propylene polymerization are dialkylaluminum chloride cocatalyst and a catalyst which is an active titanium chloride.

Thereafter, the liquid stream and catalyst flows downstream through the transporting medium conduit 74 to a separator 76 where the excess gaseous material is separated out through gas outlet 78, and thereafter the liquid stream and catalyst continues through separator outlet 80 to reactor 82, preferably a stirred bed reactor for producing polypropylene. The reactor 82 includes a product outlet line 84 and waste or recycle outlet line 86.

The overall reactor temperature range for polymerization depends upon the particular monomer which is being polymerized and the commercial product desired therefrom, and as such are well known to those skilled in this art. In general, the temperature range used varies from about 94° F. and above. The total polymerization pressure is composed of the polymerizable monomer pressure, inert gas if present, and hydrogen pressure, if used, and such total pressure typically may vary from above about atmospheric to about 600 psig. The individual partial pressures of the components making up the total pressure determine the rate at which polymerization is desired to occur, the molecular weight, and the molecular weight distribution of the polymer to be produced. The temperature of polymerization is controlled as may be understood by one skilled in the art.

The liquid stream comprises at least one member of the group consisting of propylene, butene, pentene, ethylene, hexene, and closely boiling mixtures thereof, and excluding nitrogen and inert gases. A preferred liquid stream is liquid propylene because it is the primary raw material in making polypropylene. The liquid propylene is conveyed or injected into the reactor 82, as a quench liquid to cool the contents in the reactor 82 and to carry the catalyst therein.

In a preferred embodiment, the pressure of the gaseous material from the purge conduit inlet 72 through purging means 58 is greater than the pressure of the liquid stream in transporting medium conduit 74. Accordingly, since the gaseous material pressure is greater than the liquid stream pressure, the liquid stream is substantially prevented from flowing into the chamber 23 and thereabove. When liquid propylene is utilized as the transporting medium herein, the temperature of such liquid propylene can vary widely, provided such temperature is low enough to keep the liquid in a liquid phase at the appropriate pressure in conduit 74. The flow rate of the catalyst in the liquid stream must be sufficient to substantially prevent the settling of the catalyst in conduit 74 and downstream. The flow rate can range widely, preferably from about 2 ft./sec. to about 90 ft./sec., more preferably from about 10 ft./sec. to about 70 ft./sec., and most preferably about 30 ft./sec., to minimize the chances of settling of the catalyst in conduit 74, and which further minimizes the capital investment in piping, pumps, etc.

In a preferred embodiment, the separator 76 has a pressure lower than the container 12, and the reactor 82 downstream of the separator 76, has a pressure lower than the separator to facilitate the flow of the gaseous material and liquid stream and catalyst from conduit 74, to and through separator 76, outlet 80 and reactor 82.

Although only one embodiment of this invention has been shown and described, it is to be understood that various modifications and substitutions, as well as rearrangements and combinations of the preceding embodiment can be made by those skilled in the art without departing from the novel spirit and scope of this invention.

EXAMPLE

A powdery dry solid titanium containing catalyst supported on a magnesium-containing compound, having an average size of about $10\mu$ to $30\mu$, was fed into a powder feeder as described in FIG. 1. The powder feeder was attached to a gas phase polymerization reactor. The powder feeder includes a cylindrical container which is approximately 2 inches in diameter and 10 inches in length. Catalyst was fed through the metering means 34 with a shaft rotation of 0.18 rpm, thereby allowing the catalyst to be discharged into the polymerization reactor. The powder feeder pressure and temperature were maintained at 310 psig and ambient, respectively. The rotatable section 42 of the metering means 34 had four metering ports 44, each port having a volumetric capacity of 0.00345 cubic inches. The gaseous material utilized for discharging the collected catalyst from the metering ports 44 into a liquid stream, was nitrogen which has maintained at a pressure of 310 psig. The liquid stream was liquid propylene which was maintained at 300 psig. The catalyst together with the liquid propylene was injected into the polymerization reactor to produce 50 pounds of polypropylene per hour.

The powder feeder was used with a polymerization reactor, equipped with recycle gas nozzles spaced along the bottom of the reactor and liquid quench nozzles spaced along the top of the reactor. The reactor was equipped with an off-gas port for recycling reactor gas through a condenser and back through a recycle line to the recycle nozzles in the reactor. Propylene liquid was used as the quench liquid to cool the reactor and to carry the catalyst into the reactor. Polymerization temperature and pressure were maintained at 160° F. (71° C.) and 300 psig respectively. The polymer bed was agitated by paddles attached to a longitudinal shaft within the reactor rotating at about 50 rpm. The polypropylene produced, had the following characteristics: Izod impact strength 0.61 ft.-lbs./in.; yield tensile strength 5540 psi; flexural modulus 220,000 psi; and heat deflection temperature 217° F.

We claim:

1. A powder feeder apparatus, comprising:
   a) a container for powder including an upper portion and a lower portion having a chamber;
   b) a vertical rotatable shaft substantially in alignment with an axial axis and further substantially in alignment with, and at least contained partially in said container, wherein said rotatable shaft includes agitating means extending substantially radially and outwardly from said shaft in said container for agitating and preventing clumping of said powder in said container;
   c) metering means for selectively metering predetermined amount of said powder to said chamber of said container, said metering means disposed in said lower portion of said container and operatively attached to said rotatable shaft, said chamber being a vertically elongated cavity in the aforesaid lower portion with the top end thereof open and disposed beneath the metering means to receive by gravitational force powder from the metering means and with the bottom end thereof open to permit discharge from the container of the powder therein by gravitational force; and wherein said metering means comprises a stationary section having an exit cavity and a rotatable section having a metering port, said rotatable section being rotable horizontally from a first position filling said metering port with said powder by gravitational force when said exit cavity of said stationary section and said metering port of said rotatable section are in substantial alignment, to a second position emptying said powder from said metering port by gravitational force when said metering port of said rotatable section and the upper end of said chamber in said lower portion of said container are in substantial alignment;
   d) means for selectively purging said powder downward from said metering means and downward through said chamber in said lower portion of said container disposed in said lower portion of said container, wherein said purge means includes stationary conduit means extending radially along a portion of said stationary section of said metering means including a downwardly facing entrance and exit, and rotatable conduit means extending radially along a portion of said rotatable section including an outwardly facing entrance and upwardly facing exit being moveable from a first-non-purge position when said stationary conduit means is not in substantial alignment with said rotatable conduit means and said metering port of said rotatable section and said chamber of said container are not in substantial alignment, to a second-purge position when said upwardly facing exit of said rotatable conduit means is in substantial alignment with said downwardly facing entrance of said stationary section and said metering port of said rotatable section and said chamber of said container are in substantial alignment thereby allowing a gaseous material to substantially evacuate said powder in said metering port and said chamber in said second-purge position.

2. The apparatus in claim 1, wherein said container is generally funnelled shaped.

3. The apparatus in claim 1, further comprises motor means attached to said rotatable shaft.

4. The apparatus in claim 1, wherein said agitating means includes a plurality of outwardly extending members inclined at an angle ranging from about 85° to about 5° with respect to said axial axis.

5. The apparatus in claim 1, wherein said agitating means includes a plurality of outwardly extending members inclined at an angle of from about 30° to about 60° with respect to said rotatable shaft.

6. The apparatus in claim 1, wherein said rotatable section of said metering means is substantially disc shaped.

7. The apparatus in claim 1, wherein said stationary conduit means extends radially along an inner portion of said stationary section and said rotatable conduit means extends radially along an outer portion of said rotatable section.

* * * * *